United States Patent Office 2,800,070
Patented July 23, 1957

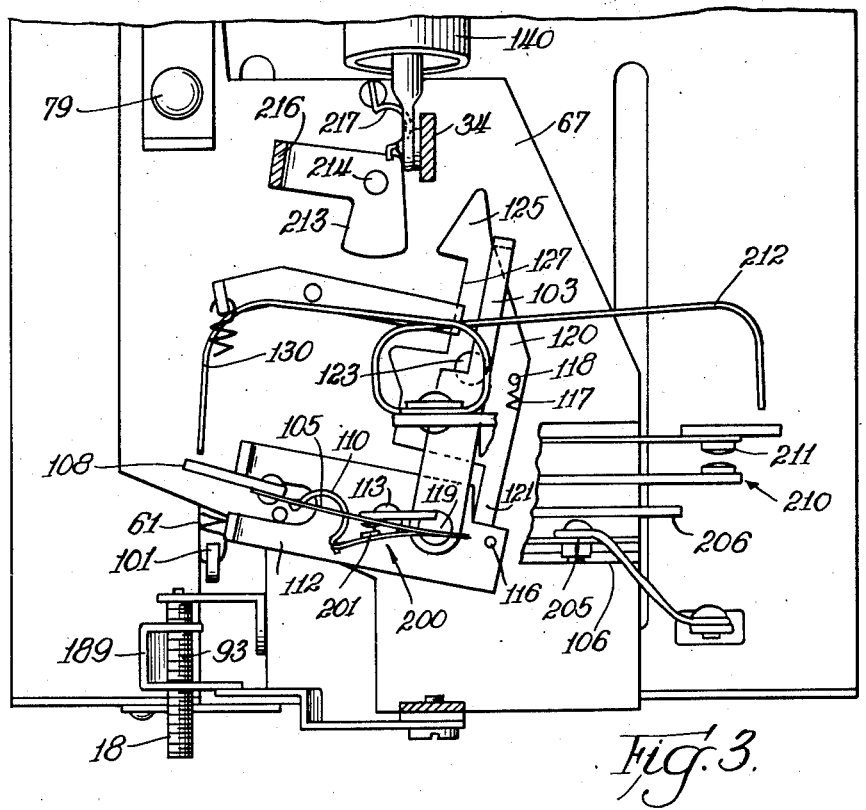
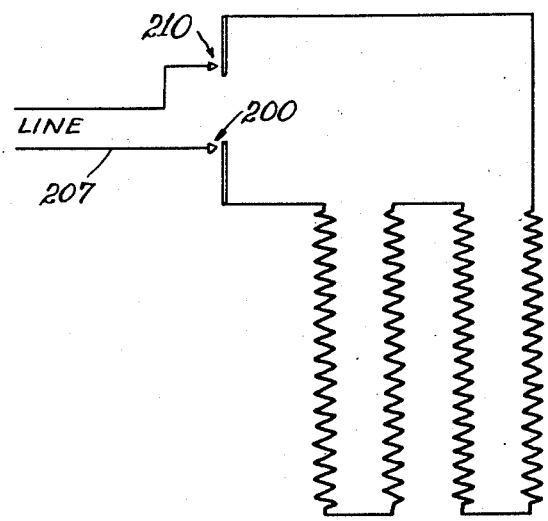
Fig. 3.
Fig. 7.
INVENTORS:
Henry L. Olson
BY Robert A. Miller July 23, 1957 H. L. OLSON ET AL 2,800,070
TOASTERS
Filed Sept. 29, 1954 5 Sheets-Sheet 5
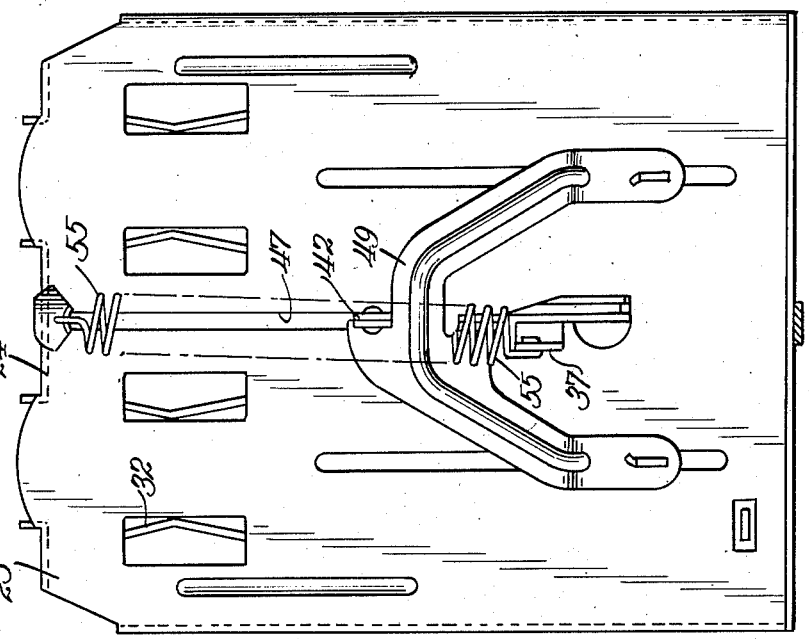
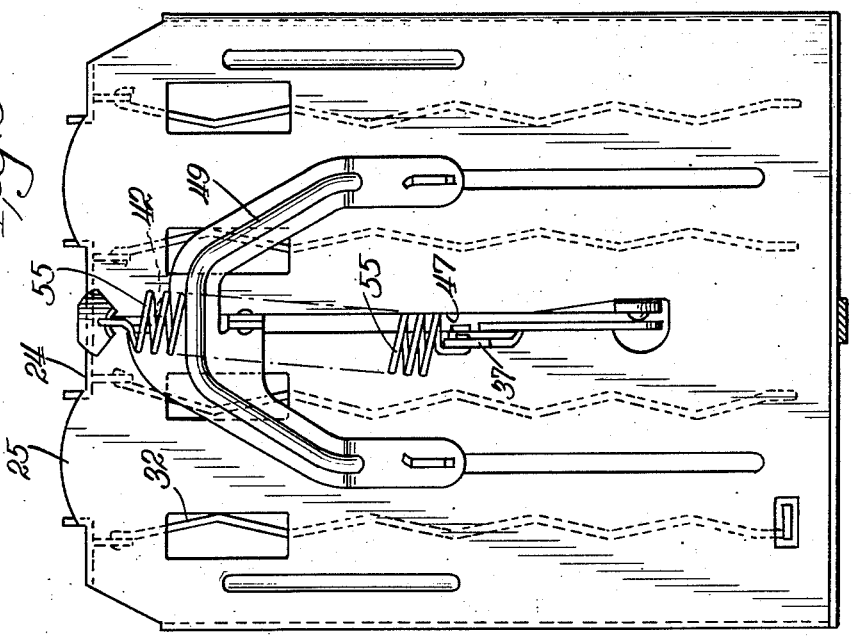
INVENTORS:
Henry L. Olson
BY Robert A. Miller

2,800,070

TOASTERS

Henry L. Olson and Robert A. Miller, Grand Haven, Mich., assignors to Camfield Manufacturing Company, Grand Haven, Mich., a corporation of Michigan Application September 29, 1954, Serial No. 459,138

4 Claims. (Cl. 99—329)

This invention relates to a new and improved automatic toaster and more particularly to a toaster in which the release mechanism is brought into operation by heat from the surface of the bread being toasted.

This application is a continuation-in-part of our application Serial No. 392,642, filed November 23, 1953, which is a division of our copending application for a Toaster, Serial No. 261,802, filed December 15, 1951, now Patent No. 2,692,549, issued October 26, 1954.

Automatic toasters heretofore provided have employed timing devices and bimetal elements to provide a cycle for toasting a piece of bread in relation to a projected period of time which, through complicated arrangements, is varied in relationship to the sensible heat present in the toasting compartment which remains from previous toasting cycles. Such mechanisms which provided timed cycles failed to allow for voltage variations; were unable to reheat cold toast without changing its color or burning it; did not maintain toast uniformity with bread slices of varying kinds and moisture content; incurred gradual deviation or creep from a set relationship due to load strains on bimetal members; burned the toast and became a fire hazard if the toast carriage failed to rise; were unsafe from an electric shock viewpoint when not toasting; inspection of the toast during the toasting period changed the toasting results expected for the toast inspected; and, when a piece of toast was removed before the end of the cycle, the cycle had to be completed in many cases before the next toasting period could be commenced.

It is an object of the present invention to provide a new and improved electric toaster of the automatic type.

One of the objects of the present invention is to provide a novel and improved electric toaster which obviates these difficulties and objectionable characteristics.

It is a further object to provide a toaster which will produce uniform toast of the selected color regardless of wide variations in line voltage and power factor.

It is an additional object to provide a toaster which will function to produce uniform toast through repeated consecutive toasting cycles regardless of the moisture content and age of the bread.

It is also an object to provide a toaster which may be used, with automatic operation, to reheat cold toast without excessive darkening or burning.

It is another object to provide a toaster in which the release is put into operation by heat transmitted from the toast surface independently of any timing relationship.

It is a further object to provide such a toaster with a snap-action, quick release which also stops the toasting operation regardless of whether the bread remains in its toasting position selectively or inadvertently.

It is an additional object to provide a toaster having a simple, manual release from toasting position.

It is also an object to provide a toaster in which the toasting control mechanism is self-compensating against variation in toaster housing temperatures.

Another object is to provide an electric shock-proof toaster when not in use but still plugged into the house current.

A further object is to provide an improved snap action release in which the thermal responsive element relaxes in its operation to a spring force that opens the heating circuit with slight effort and sets in motion a member whose inertia releases the toaster carriage.

Another object is to provide an improved toasting control in which the toasting operation can be terminated any time and restored at any time for the same slice of toast or successive slices of bread without delay and without interfering with toast uniformity.

Other and further objects will appear as the description proceeds.

We have shown certain preferred embodiments of our invention in the accompanying drawings, in which—

Fig. 3 is an end elevation of the toaster mechanism as seen from the right of Figs. 1 and 2 and with the parts in the raised position, certain parts being broken away for the sake of clarity;

Fig. 5 is a view similar to Fig. 3, but showing the left or switch end of the toaster with the parts in the raised position and the switch open;

Fig. 6 is a view similar to Fig. 5, but showing the parts in the lower position with the switch closed; and Fig. 7 is a schematic diagram of the electrical circuit embodied in the invention.

Figure 1:
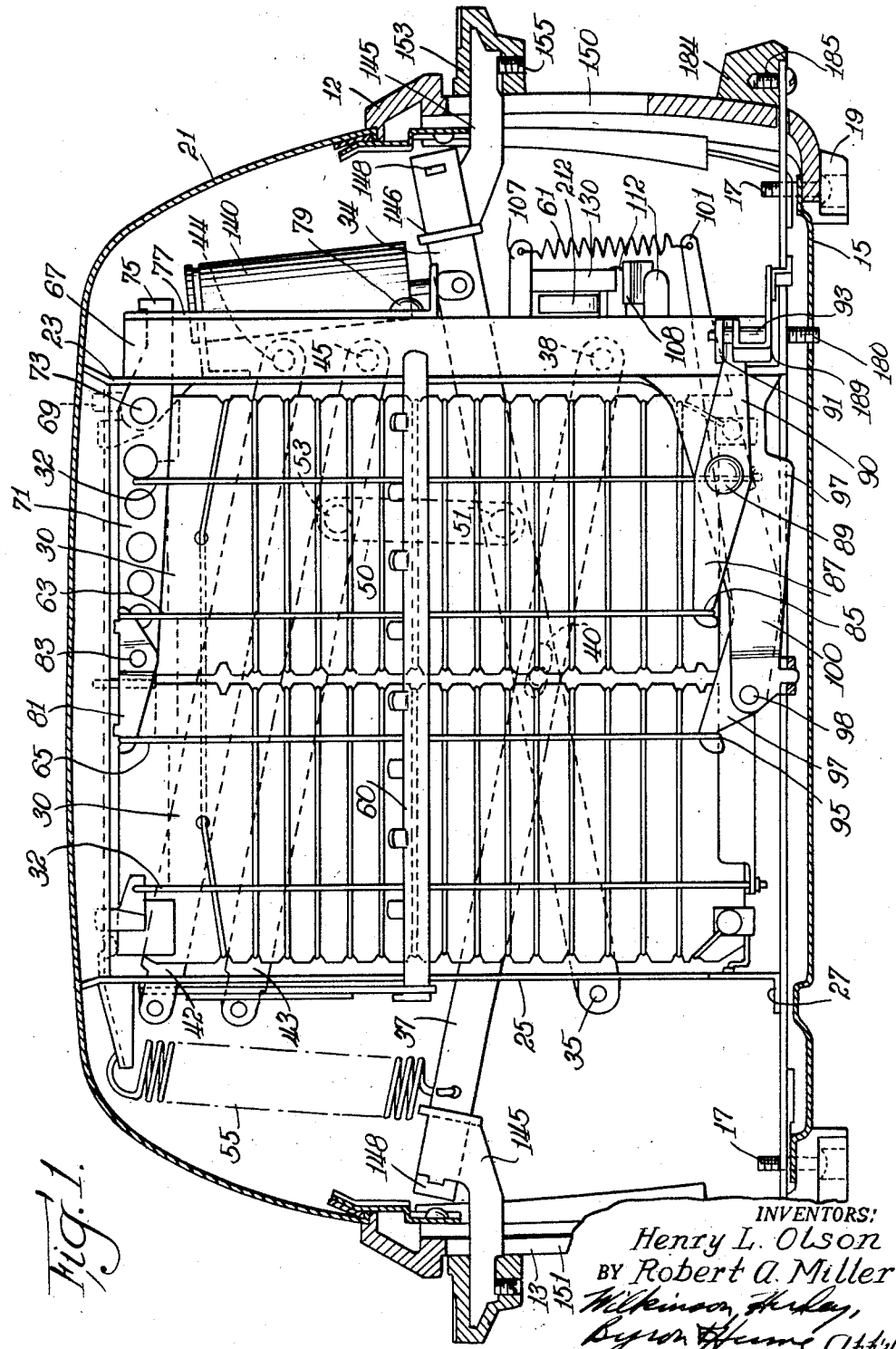
Fig. 1 is a side elevation, partly in section, showing the toaster with the housing partly removed and with the parts in the upper position.
Figure 2:
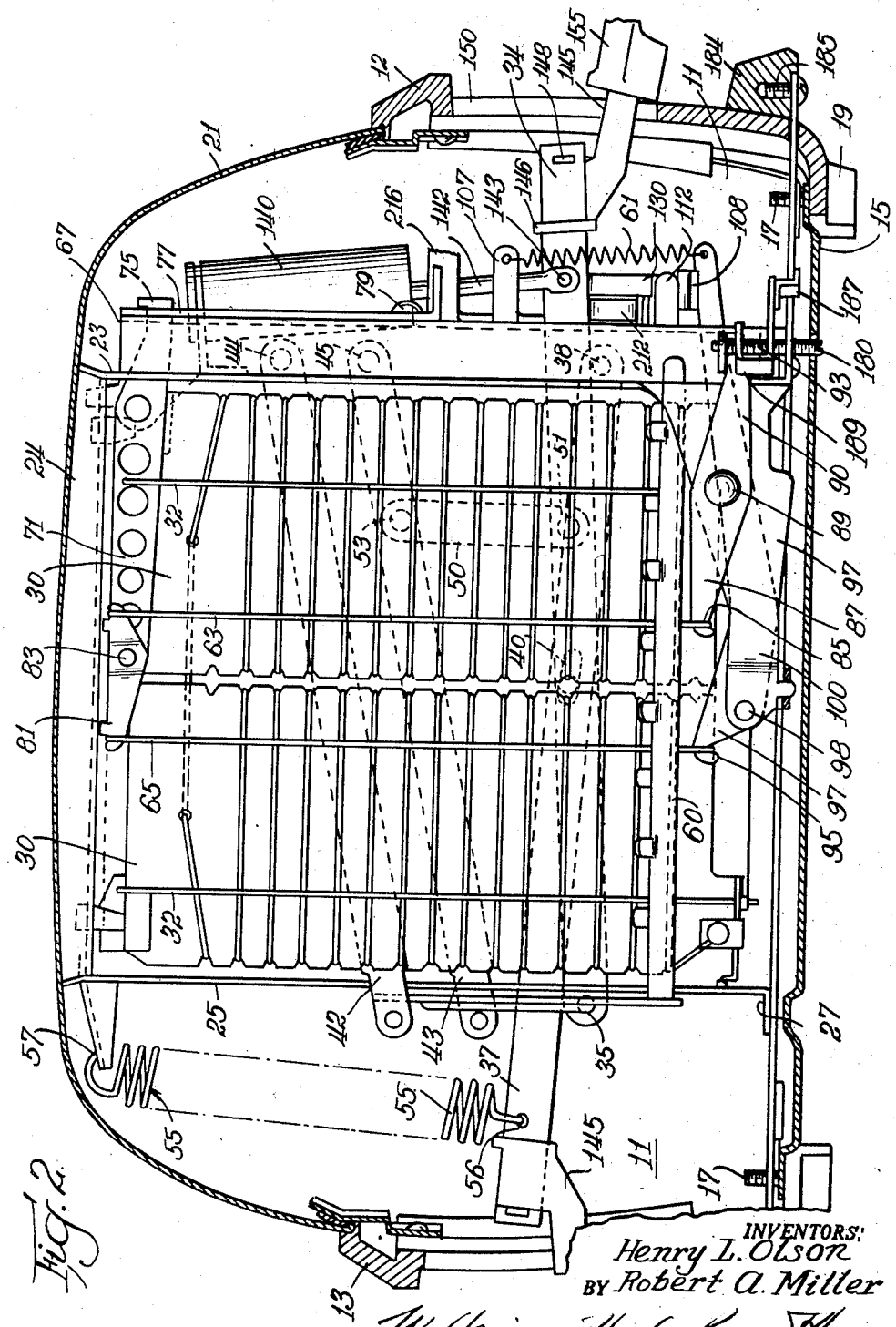
Fig. 2 is a view similar to Fig. 1, but showing the parts with the toaster in the toasting position.

Referring first to the construction as generally shown in Figs. 1 and 2, the toaster mechanism is supported in a lower housing member 11 to which are secured end closure plates 12 and 13. These plates 12 and 13 are also secured to a bottom closure plate 15 by means of the screws 17. The plates 12 and 13 are shown as provided with integral feet 19 for supporting the assembly in spaced position above a tabletop or other surface. The housing is completed by an upper housing member 21 which is secured to the lower housing member and which, it will be understood, is provided with usual openings in its upper surface for the introduction and removal of bread to be toasted.

The toaster mechanism generally is supported on a U-shaped frame having a downwardly extending right end plate 23, an upper horizontal connecting portion 24 and a left downwardly extending end plate 25, as shown in Figs. 1 and 2. This frame plate has out-turned feet 27 and 28 which extend across and have their ends connected to the lower casing member 11. The interior mechanism is thus removable as a unit from the housing by taking out the connecting screws which are not shown. The housing supports a plurality of generally similar heating elements 30 which consist in resistance wire wound preferably on mica, as is customary in the art, it being appreciated that spun glass or asbestos sheets can be used. The bread is lowered between the pairs of heating elements and held a spaced distance from the elements by the usual crimped wires such as indicated at 32.

A linkage is provided for raising and lowering the toast, this linkage being so connected that it is operable from either end of the toaster. The right-hand operating lever 34 extends through the center of the toaster between the intermediate heating elements and has its left end pivoted at 35 to the left end portion 25 of the frame member. Similarly the left-hand operating lever 37 extends parallel and adjacent to the lever 34 as pivoted at 38 to the right end 23 of the frame. The two levers are connected by pin and slot arrangement, as indicated generally at 40, by means of which downward movement of one lever causes similar downward movement of the other lever. The mechanism also includes a pair of intermediate levers 42 and 43, the ends of which are pivoted at 44 and 45 to the right-hand frame member 23. The opposite ends of these levers pass through the vertical slot 47 shown in Figs. 5 and 6 in the left end frame member 25 and are pivotally connected to a yoke 49. These intermediate levers, due to their parallel movement, cause the yoke 49 to move upwardly and downwardly parallel to the surface of the frame member 25. The movement of these intermediate levers and the yoke is caused by connecting link 50 which has its lower end pivotally connected at 51 to the right-hand main lever 34 and its upper end pivotally connected at 53 to the lower intermediate lever 43. The spacing of the link 50 from the pivots 35 and 45 determines the amplitude of movement of the yoke 49.

An actuating spring 55 has its lower end connected at 56 to the operating lever 37 and its upper end connected at 57 to a bracket 59 extending laterally from the left frame member 25. This spring 55 is a tension spring and normally maintains the parts in the position shown in Fig. 1. Bread carriers 60, such as shown in Fig. 1, extend inwardly from yoke 49 to support the slices between the heating elements and the effort of spring is sufficient to raise the carriers when laden with toast.

According to the present invention the carriers 60 are retained in toasting position by means of a latch 120 which is releasable when the temperature of the bread being toasted reaches a predetermined level. The mechanism for releasing the bread supporting carriers 60 includes a support control frame 67 provided with a tension spring 61 operating to hold taut the wires 63 and 65 which are elongated with the increase of heat radiated from a slice of bread placed adjacent said wires. As the wires 63 and 65 elongate, they relax the control support frame 67 to afford release of the latch 120 through the medium of the spring 61 in a manner hereafter described. It will be noted from Figs. 1 and 2 that these wires 63 and 65 replace two of the usual crimped wires 32 for keeping the bread spaced from the heating elements 30 and can be located any place desired with corresponding allowances in the lengths of their supports on the control support frame 67.

The control support frame member 67 is generally U-shaped in horizontal cross section and is secured to and projects outwardly from the right end plate member 23. It also has an integral arm extending inwardly of the plate 23, this arm having an upwardly extending ear 69. The pivoted arm 71 is pivotally secured at 73 to the inner portion of control frame 67. This pivoted arm 71 has a right arm portion 75 extending outwardly through an opening in a link 77 which is secured to the frame member 67 by a rivet at 79. This link 77 is preferably formed of some material such as brass which has a higher co-efficient of expansion than the steel of which the frame member 67 is formed. It will be understood that the particular materials used may be varied, the important feature being that the link 77 has an appropriate co-efficient of expansion to maintain the working relationship between the frame 67 to which it is secured, and the wires 63 and 65 under variations in temperature within the housing. The purpose of this co-efficient of expansion differential will be more fully hereafter described. The pivoted support arm 71 carries adjacent its left end, a short lever 81 mounted on a pivot 83 on the arm 71. The upper end of the actuating wire 65 is secured at the left end of lever 81 while the upper end of wire 63 is secured at the right end of the same lever. It is to be noted that there is a 2 to 1 ratio between these arms, the left end supporting wire 65 being longer.

Figure 4:
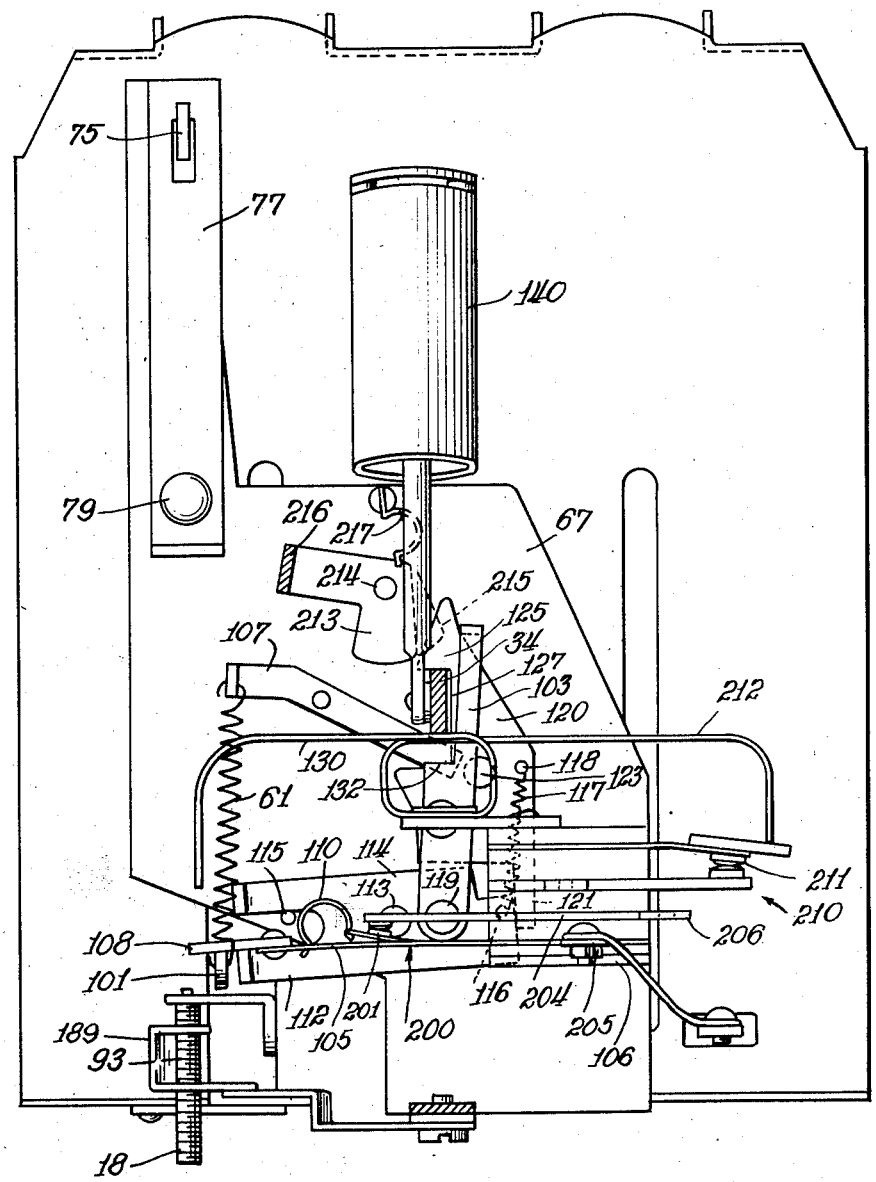
Fig. 4 is a view similar to Fig. 3, but showing the parts in the lower or toasting position.

The lower end of wire 63 is connected at 85 to the left end of a lever 87 pivotally supported from the lower portion of the control frame 67 at 89. The right end 90 of this lever 87 has a horizontally extending ear 91 which is engaged by the upper end of the adjusting screw 93. This adjusting mechanism will be described in detail hereinafter. It will be noted, however, that the point of connection at 85 between the wire 63 and the arm 87 serves as a fixed starting point for the movable linkages connected by the wire 63, the pivoted lever 81, and the wire 65. The lower end of wire 65 is connected at 95 to the left end of a lever 97 which will be identified as the release lever. This release lever 97 is pivoted at 98 on a fixed arm 100 which extends rearwardly from the control frame member 67. This release lever 97 extends to the right beyond the control frame member 67 and has an end 101 as shown in Figs. 3 and 4. The tension spring 61 has its lower end connected to the arm 101 of release lever 97. The upper end of this spring 61 can be connected at a fixed point, but preferably is connected to the end of a lever 107 pivotally mounted on the frame member 67 so that the other end is engaged and displaced by the manual lever 34 to place the spring under tension when the lever 34 is down, and release the spring from tension when the lever 34 is up, it being appreciated that tension on the wires 63 and 65 is required only during the toasting operation at which time the tension tends to raise the right end of lever 97 and serve both as a slack take-up for the wire 63 and 65 as it elongates, and as a source of power to release the latch 120 as hereinafter described.

Referring next to Figs. 3 and 4, these figures show the latch mechanism in the "off" and "on" position, respectively. A snap-acting switch 200 is secured as a unit 202 to an extension 106 of the frame member 67 and includes a snap spring 105 that is provided with an insulated end 108 which is actuated by the upward movement of the end 101 of the release lever 97 to release the latch 120 in a manner hereafter described and to deenergize the switch 200 by moving a contact 201 away from a contact 203 mounted on an elongated bus bar 204. The spring 105 is provided with a well-known type of snap-over device including an arcuate spring 110 so that once the insulated end 108 passes over center, it is suddenly snapped in either direction. The outer ends of the spring 105 and bus bar 204 have binding post ears 205 and 206 respectively to place the switch contacts in circuit to make and break one side of the house line 207 (Fig. 7). Then when the insulated end 108 is forced downwardly a sufficient distance, the arcuate spring 110 snaps the contact 201 upwardly into engagement with the contact 203, and when the release lever 97 is drawn upwardly a sufficient distance by the tension spring 61 as permitted to do so by the elongation of wires 63 and 65, in a manner hereafter described the snap spring 105 is snapped upwardly by the arcuate spring and the contact 201 breaks with contact 203 to open the toaster circuit regardless of whether or not the latch 120 and carrier 60 are free to move upwardly, thereby terminating the toasting operation. In normal operation, the snapping of the switch 105 upwardly along with its associated insulated end 108 effects automatic release of the latch 120 and the carriers 60. The above described operation of the switch 105 affords deenergization of the toaster circuit even in the event that the mechanism for releasing the latch 120 is inoperative.

A bifurcated latch releasing lever 112 is pivoted at 113 on the lower face of the frame member 67. Its movement is limited by a stop pin 115 mounted on member 67 and carries at the other side of the pivot point 113 a pull down link 103 pivoted to it as at 119. The link 103 operates to secure the latch 120 in the locking position, as shown in Fig. 4. The bifurcated end of the latch holding lever 112 is arranged to straddle also the insulated portion 108 of the member 105 and with the member 105 in its upper position, the parts are as shown in Fig. 3 whereby the stop pin 115 serves a dual function including limiting movement of the spring 105. The right end of the lever 112 is provided with a pin 116 to which is secured one end of a tension coil spring 117. The opposite end of spring 117 is secured to a pin 118 which extends from the latch lever 120. The latch lever 120 is pivotally supported at 123 on the frame member 67. The upper portion of the latch lever 120 has a holding hook at 125 and adjacent and below that hook is a recess 127 which accommodates the manual lever 34. As shown best in Fig. 4 the hook 125 overlies the upper edge of the lever 34 when the carriers 60 are latched in toasting position.

A resilient element 130 mounted at one end on the switch block 202 is actuated by the lowering of the lever 34 to force the insulated end 108 of the spring 105 downwardly to afford engagement of the contact 201 with the contact 203. As the insulated end 108 moves downwardly, it rotates the latch release lever 112 in a counterclockwise direction so that it assumes the position shown in Fig. 4. Thereby the link 103 is pivoted upwardly to the position shown in Fig. 4, in which an arm 122, which extends normally to the plane of the link 103 overlies the rear edge of the hook 125 to retain this hook in latching position.

Whenever the manual lever 34 is down, it closes a second switch 210 connected in the other side of the house line 208. This switch is a part of the switch block 202 and includes contact 211 carried by suitable springs actuated by a second resilient lever 212 engaged by the manual lever 34. The opening of either switch stops the toasting operation and when both are open as when the lever 34 is raised, the toaster, as far as readily accessible parts are concerned, is dead electrically.

When it is desired to inspect the toast, the next time the lever 34 is pressed downwardly, the link 103 is initially forced downwardly to force the right end of the latch release lever 112 out of interference relationship, thereby permitting the latch 120 to move out of latching relationship with the lever 34. After this release, the lever 34 follows the fingers of the operator upwardly to raise the carriage as the downward pressure is relaxed.

Also, the link 103 is released to raise the toast carriage automatically when the end 101 of lever 97 is raised by the spring 61 upon elongation of the wires 63 and 65. The spring 105 snaps upwardly striking with its upward inertia the upper arm of the bifurcated portion of latch release lever 112 with enough force to rotate the latch release lever 112 clockwise and release the link 103 and thereby the latch lever 120.

Thus it will be seen that all latch release strains are borne in three ways, by hand, by the spring 61, and by the inertia of the snap acting switch member without operative strain upon the thermal wires 63 and 65. In this way the load on the thermal responsive elements of the toaster is a negative load, thereby eliminating strains which would cause it to get out of adjustment.

In this connection it is interesting to note that there is no substantial tension opposing the recovery of the wires when they cool preparatory to a repeated toasting operation, it merely being desirable under nontoasting conditions to have the wires under only slight tension to hold them in place.

When the arm 34 moves upwardly after a latch release, it is preferred that the upward movement be cushioned by a dash pot 140 which contains a piston operated by rod 142, the lower end of which is connected at 143 to the right operating lever 34.

For purposes of convenience in assembly and in operation, a removable operating arm 145 can be attached to each of the operating levers 34 and 37. This member 145 has a laterally extending portion 146 with an opening such as to fit over the end of the lever 34 or 37 and is provided with a lug 148 fitting in a corresponding perforation in the end of the lever 34 or 37 so that it is rigidly connected as an extension to the lever. The members 145 pass through narrow slots 150 and 151 in the end closure plates 12 and 13, respectively. These narrow slots prevent lateral movement in the members 145 such as to disengage the lugs 148 after the parts are assembled. Finger pieces 153 are secured on the ends of the members 145 by set screws 155.

It will be apparent that the wires 63 and 65, when at room temperature, will be of such a length as to pull up on the left end of the release lever 97 causing its right end 101 to be swung downwardly. This permits the snap switch member 105 to be moved to its lower position with the end 101 of the lever 97 below the member (Fig. 4). When a piece of bread is inserted in the side of the toaster carrying the operating assembly including wires 63 and 65, the bread will be closely adjacent or in contact with these wires. The finger piece 153 at either end of the toaster may be depressed and the bread carrier 60 carried by yoke 49 will move downwardly carrying the bread to a lower position where it is fully enclosed within the toaster. As this downward movement takes place, the lower edge of the right operating lever 34 will close the switches 200 and 210 as already described through resilient levers 130 and 212 respectively. It will also operate the latch as already described to hold itself in lowered position. It will also place the spring 61 under proper tension and with the application of heat, moisture will be driven from progressively deeper portions of the bread, the temperature during this time remaining at approximately 212° F. Then, when the surface of the bread dries, its surface heat begins to rise and with it the browning of the bread. The temperature of the surface of the bread is "sensed" by the wires 63 and 65, being in close proximity thereto, and these wires expand or lengthen under the influence of the heat.

It may be noted at this point that, although heat may be radiated to wires 63 and 65 from the adjacent heating element, the controlling factor in the operation is the heat radiated or transmitted by contact with the bread surface. The parts are so calibrated that this heat serves to control the actuation of the toaster.

By way of example, and not by way of limitation, in an actual toaster constructed in accordance with the drawings, it has been found that the wire 63 will expand or lengthen according to the temperature of the toast approximately .004 inch. The pivoted member 81 has a 2 to 1 ratio so that with the lower end of wire 63 fixed, this expansion of wire 63 will permit the left end of member 81 or the upper end of wire 65 to move downwardly .008 inch. The wire 65 is identical with wire 63 and will have an additional .004 inch expansion. This permits a total downward movement of the left end of lever 97 of 0.12 inch. Lever 97 has an 8 to 1 ratio so that the end 101 of that lever, where it engages the insulated end 108 of the snap acting knock-off member 105 will have approximately ³⁄₃₂ of an inch movement. Thus, as the heat of the bread surface is raised, the wires 63 and 65 expand and the levers swing in the directions just described. The right end of lever 97 is drawn upwardly by spring 61 which acts to move that end of the lever as permitted by the expansion of the wires.

When the lever 97 has reached such a point that the lower ear 101 of the lever moves the snap acting spring knock-off member 105 past center, the spring 110 gives it a quick snap action moving its upturned end 108 sharply upward and opening the switch 200. The upper edge of member 108 hits against the lower face of the left end of the latch holding lever 112, swinging that lever in the clockwise direction about its pivot 113. This movement causes the release of the lower end 121 of the latch 120 and spring 117 swings the latch to the position shown in Fig. 3. This releases the right operating lever 34 and the spring 55 raises the parts to the position shown in Fig. 1. This lifts the upper portion of the toast to a point above the upper surface of the toaster where it can be grasped by the fingers, releases the major portion of tension on spring 61 and opens the switch 210.

If, at any time, during a heating or toasting cycle it is desired to release the catch so that the mechanism will operate under the influence of spring 55 to raise the bread, this may be accomplished by a short downward movement of either finger piece 153. This movement, as previously described, will cause the latch release as already described.

After this manual release has been used the latch release member will move again to its open or inoperative position on the upward movement upon release. It will remain in its open or inoperative position until the main lever 34, or lever 37 has again been depressed and locked at the bottom of its stroke.

It will be apparent that the control wires 63 and 65 carry no current, but are controlled entirely as to their expansion by heat which they receive by radiation or by contact and are thereby not affected by other self-induced heat and variations therein due to voltage changes. Consequently, the operation of the toaster is entirely independent of any variations in the line voltage applied to the toaster. The same is true, of course, as to wide variations in the line power factor of the electrical supply to the toaster. The toast will also be uniform regardless of the moisture content of the bread being toasted. If the bread is moist, the drying off of the moisture will have a cooling effect on the control wires so that the toasting cycle will be properly prolonged and will adequately and uniformly toast the bread after excess moisture is driven out.

Also, the toaster, as designed, will operate uniformly throughout consecutive toasting cycles. The frame member 67 will increase in height as the toaster gradually heats up, this member being made of steel in the preferred form. This increase in height would have the effect of modifying the actuation of the toaster were no compensation provided. The expansion would be in the opposite direction to the operating expansion of the wires desired, in that it would raise the upper ends of the wires. To take care of this, the upper end of the wires are supported from the pivoted arm 71 which is supported from the frame member 67. The short end 75 of this arm 71, however, extends through the compensating link 77 which may be formed of brass. This member 77 will expand to a greater extent than member 67 so that as the pivot 73 moves upwardly, the right end 75 of the arm 71 moves upwardly more rapidly than the pivot. The ratio of the two arms of the member 71 is such as to properly compensate for the expansion of the support frame 67. The toasting cycle will thus be uniform regardless of the temperature of the interior of the toaster and of the frame member 67. It will be understood that various materials may be used for the frame 67 and for the compensating member 77 and that the lever arms provided for the members 71 which will be dependent upon the ratios of expansion of the members 67 and 77.

It has been pointed out that the screw 93 served to raise or lower the right end 90 of lever 87 so as to adjust for the desired darkness or lightness of toast. This screw may be adjusted from below by a screw driver engaging the head 180. Means are also provided for manual adjustment of the character of the toast while the toaster is in use. These means comprise a long lever 182 pivoted at the center of the underface of the toaster mechanism with ends of the lever extending outwardly at each end of the toaster. These ends carry operating knobs 184 held in place by screws 185. This color control bar 182 is connected by link 187 to a long arm 188 of a U-shaped member 189 which is fitted about the screw 93 so that the screw passes through both legs of the member. This member 189 engages screw 93 with sufficient frictional force so that movement of the color control bar 182 will, through link 187, swing the member 188 and turn the screw 93 to vary the screw adjustment. This frictional contact is not, however, great enough to prevent rotation of the screw 93 by a screw driver without disturbing the adjustment of the color control bar.

A further feature of the invention resides in the use of a manually set latch element 213 pivotally mounted as at 214 upon the frame where it can be snapped into and out of a position blocking the rise of the lever 34 as shown in dotted line 215. An ear 216 extends through the outer housing 21 where it is accessible for manipulation as snap-held in alternate positions by an over-the-center spring 217. When moved to block the rise of the lever 34, the carriage remains in lowered position to keep the toast where it will be dried by residual heat in the toasting compartment to provide a drier piece of toast and keep it warm for a longer period of time after the toasting operation is ended.

While we have shown certain preferred embodiments of our invention, it will be understood these are illustrative only and that various modifications may be made to take care of differing conditions and requirements. We, therefore, contemplate such variations as come within the spirit and scope of the appended claims.

We claim:

1. In a food-cooking device the combination of heating means, food-shifting means including carriers for moving the food between two positions in one of which the food is in close proximity to the heating means, said food-shifting means being operable by a lever, means including a latch engageable with said lever for releasably retaining said food-shifting means in said one position, switch means for energizing said heating means, said switch means being actuatable by resilient means operated by said food-shifting means, and means for controlling said heating means, said last-named means including thermally-responsive wires adapted to be contacted by the food when the carriers are in said one position and being operative normally upon elongation to release said retaining means and said switch means when the temperature at the surface of the food reaches a predetermined level, said switch means including a first switch adapted to be opened regardless of whether said retaining means is released and a second switch normally deenergized upon the release of said retaining means.

2. In a food-cooking device the combination of heating means, food-shifting means including carriers for moving the food between two positions in one of which the food is in close proximity to the heating means, said food-shifting means being operable by a first lever, means including a latch engageable with said lever for releasably retaining said food-shifting means in said one position, switch means operable in response to the movement of said food-shifting means to said one position for energizing said heating means, said switch means being actuatable by resilient levers engaged by said first lever, and means for controlling said heating means, said last-named means including thermally-responsive wires adapted to be contacted by the food when the carriers are in said one position and being operative normally upon elongation to actuate a lever to release said retaining means and said switch means when the temperature at the surface of the food reaches a predetermined level, said switch means including a first switch adapted to be opened regardless of whether said retaining means is released and a second switch normally deenergized upon the release of said retaining means.

3. In a food-cooking device the combination of heating means, food-shifting means including carriers for moving the food between two positions in one of which the food is in close proximity to the heating means, said food-shifting means being operable by a first lever, means including a latch engageable with said lever for releasably retaining said food-shifting means in said one position, switch means operable in response to the movement of said food-shifting means to said one position for energizing said heating means, said switch means being actuatable by resilient levers engaged by said first lever, means for controlling said heating means, said last-named means including thermally-responsive wires adapted to be contacted by the food when the carriers are in said one position and being operative normally upon elongation to actuate a lever to release said retaining means and said switch means when the temperature at the surface of the food reaches a predetermined level, said switch means including a first switch adapted to be opened regardless of whether said retaining means is released and a second switch normally deenergized upon the release of said retaining means, and means for varying the length of the cooking cycle, said last-named means including an adjusting screw for controlling the degree of effective elongation of said wires to advance or retard the release of said latch and the opening of said switch means.

4. In a food-cooking device the combination of heating means, food-shifting means including carriers for moving the food between two positions in one of which the food is in close proximity to the heating means, said food-shifting means being operable by a first lever, means including a latch engageable with said lever for releasably retaining said food-shifting means in said one position, switch means operable in response to the movement of said food-shifting means to said one position for energizing said heating means, said switch means being actuatable by resilient levers engaged by said first lever, means for controlling said heating means, said last-named means including thermally-responsive wires adapted to be contacted by the food when the carriers are in said one position and being operative normally upon elongation to actuate a lever to release said retaining means and said switch means when the temperature at the surface of the food reaches a predetermined level, said switch means including a first switch adapted to be opened regardless of whether said retaining means is released and a second switch normally deenergized upon the release of said retaining means, and means for varying the effective actuation of said release lever to control the length of the cooking cycle, said last-named means including an adjusting screw for raising or lowering said release lever so that its effective distance of travel is varied and the release of said latch and the opening of said switch means is advanced or retarded as desired.

References Cited in the file of this patent

UNITED STATES PATENTS

| | | |
|---|---|---|
| 2,337,124 | Olving | Dec. 21, 1943 |
| 2,549,094 | Huck | Apr. 17, 1951 |
| 2,564,321 | Brosseau | Aug. 14, 1951 |
| 2,570,453 | Huck | Oct. 9, 1951 |
| 2,587,968 | Coons et al. | Mar. 4, 1952 |
| 2,692,549 | Olson et al. | Oct. 26, 1954 |